3,030,199
PRE-EMERGENT CRABGRASS CONTROL
Arthur Schwerdle, Vineland, N.J., assignor to Vineland Chemical Company, Vineland, N.J.
No Drawing. Filed Aug. 9, 1960, Ser. No. 48,363
17 Claims. (Cl. 71—2.7)

This invention relates to a method of controlling unwanted plant growth, and more particularly, to a method of pre-emergent control of weeds, especially crabgrass.

The present invention is an improvement in the field of herbicides, to which my Patent No. 2,678,265 relates.

Crabgrass is a prevalent, pestiferous weed, which is particularly noxious when it invades areas in which permanent grasses are cultivated, such as lawns, golf courses, farm land and so forth. Permanent grasses such as turf grasses are perennials; they live through the winter, and survive from year to year. Crabgrass is an annual grass, which comes up from seed each spring, flourishes and produces seed during the summer, and dies after the first frost. Generally crabgrass grows more vigorously than turf grasses. Therefore, during its growing season, it crowds out adjacent turf grass. Then when the crabgrass dies at the onset of winter and the plants rot away, bare spots are left where it has grown. These spots remain bare for the winter and spring, leaving unsightly gaps in the turf.

Each crabgrass plant produces enormous numbers of seeds. Unless steps are taken to control it, multiplication of the crabgrass plants each year will end by driving out the desirable perennial grasses entirely.

The most desirable method of controlling crabgrass is to prevent its growth altogether. This can be done by using pre-emergent herbicidal methods effective against crabgrass seed.

Pre-emergent control of undesired vegetation is effected by methods which attack vegetation before the termination of the process of germination. Germination is the development of the plant embryo from a seed to a young plant. The seed contains the plant embryo and also contains stored food. In the presence of adequate water and oxygen, when exposed to a suitable temperature, the seed begins to germinate. The developing embryo gets its food from the seed. Germination becomes completed when the young plant has become independent of the food stored in the seed. Independence is established with the formation of the first leaves of the plant above ground, in the air.

Pre-emergent control of crabgrass in turf is desirable because the turf is then never exposed to competition and crowding out by crabgrass plants during the growing season. Adequately nourished turf grass will spread and proliferate, given opportunity. It will accordingly cover bare spots left by the death of crabgrass plants, at the end of the previous season, if control of the crabgrass is effected at the start of the new growing season. Thus, spotty lawns, by proper horticultural practice, are enabled to develop into the desired full, even, luxuriant stand of perennial turf grasses.

Since the environment from which crabgrass is to be eradicated is generally one in which the crabgrass seeds are intimately associated with valuable turf grasses, herbicidal methods which would injure the turf grass or other useful vegetation are unacceptable. It is essential that any method of preventing the growth of crabgrass seed be selective to effect pre-emergent control of the crabgrass without destroying material quantities of useful grasses and plants in the environment treated. Moreover, it is highly desirable for a crabgrass preventive method to be selective in its action, not just as between seeds and established plants, but between crabgrass seeds and turf grass seeds. Since crabgrass is eradicated with the purpose of encouraging desirable grasses to grow instead, the use of a pre-emergent herbicide will generally be followed by sowing turf grass seed. If it is necessary to wait until the herbicide has lost its activity in the soil before turf grass seed can be sown, other weeds have an opportunity to become established.

Methods which have been known hitherto for pre-emergent crabgrass seed control have been deficient in lacking such selectivity coupled with ability to produce complete crabgrass control. For example, it is known that calcium arsenate is only marginally selective: the seeds of certain turf grasses are realtively resistant to it, but other common turf grass seeds succumb and are killed by it. Besides, calcium arsenate is defective in being toxic to humans and requiring use of hiigh application rates, on the order of ten pounds per thousand square feet. Of the organic herbicides, a chlorinated aromatic ester like tetrachloro dimethyl terephthalate is an active pre-emergent at a low rate of application, but is not at all selective between seeds, and kills turf grass seeds indiscriminately along with crabgrass seeds. A polychlorinated polyalicyclic like chlordane is expensive compared to the arsenicals, and at economically low rates, it produces only partial pre-emergent control of crabgrass.

It is an object of this invention to provide a novel method of selectively preventing the growth of undesired vegetation.

A particular object of this invention is to provide a novel method of selectively preventing the growth of crabgrass.

A further object of this invention is to provide a novel method of selectively preventing the growth of crabgrass without destroying material quantities of useful grass and plants or seeds thereof.

Another object is to provide a novel method of selectively preventing the growth of crabgrass which comprises treating soil containing crabgrass seeds and containing turf grass, without inflicting appreciable injury on the turf grass.

Still another object is to provide a novel method of controlling the growth of crabgrass from seeds which is selectively toxic to crabgrass growth but not to the growth of valuable turf grass from its seeds.

These and other objects will become evident on consideration of the following specification and claims.

In accordance with this invention, there is provided a novel method of selectively preventing the establishment of crabgrass which comprises applying to soil containing crabgrass seed, a neutral salt selected from the group consisting of calcium and titanium organoarsonate wherein the organic radical of the organoarsonate is an aliphatic hydrocarbon radical of from 1 to 6 carbon atoms selected from the group consisting of saturated radicals and olefinc radicals containing a —CH=CH—group, in an amount of at least about one-half pound per thousand square feet, and sufficient to prevent crabgrass seed from substantially outliving the germination period thereof, but insufficient to destroy material quantities of useful grasses and plants and seeds thereof in said soil.

As will appear hereinafter, in its broader aspects, this invention provides a method for selectively preventing the growth of unwanted grassy weeds generally, including bunch-grasses and annual weedy grasses, in turf comprising valuable sod-forming perennial grasses, by applying a salt of the stated nature to soil containing the weed grass seed; but crabgrass is the weedy grass of most concern in this connection, and the invention is described below accordingly with particular reference to crab-grass.

It has been found that the stated novel method, employing the stated calcium and titanium aliphatic organoarsonates as pre-emergent herbicides, is highly effective and selective in preventing germination of crabgrass. When these salts are applied as above stated to soils containing crabgrass seed, substantially complete germination control is effected. The crabgrass seeds are prevented from becoming plants. The crabgrass seeds may be so affected that they are not viable. The stated method can be and generally is so effective that the developing embryo does not even emerge from the soil. In some cases, the developing embryo may actually come above ground level, but it will be so vitiated as to be incapable of becoming a plant. In any case, the result is effectual pre-emergent herbicidal activity in suppressing crabgrass plant growth.

At the same time, the stated method is selective in its action. It does not inflict any appreciable injury on the desirable, useful grasses and plants growing in the soil which is treated. Thus it is an actually practical procedure for use in controlling crabgrass, since it can be used in the environment where crabgrass is considered especially objectionable, that is, associated with valuable turf grass, without damaging the turf grass.

Moreover, the preferred members of the stated group of salts are surprisingly devoid of any material destructive effect on seeds of such useful grasses and plants present in the soil which is treated. Thus, grass seed may be planted contemporaneously with use of these salts in the present novel method of crabgrass pre-emergent control, if desired. Therefore the user has the particular and important advantage of being able to make an early start on re-establishing turf grass in areas from which it was previously crowded out by crabgrass, for example.

In practicing the method of the present invention, the salt used will be selected from the group consisting of neutral calcium and titanium organoarsonates wherein the organic radical of the organoarsonate is an aliphatic hydrocarbon radical of from 1 to 6 carbon atoms selected from the group consisting of saturated radicals and olefinic radicals containing a —CH=CH— group. In referring to the stated salts, what is meant is a salt of an arsonic acid of the formula $RAsO_3H_2$, where R is an aliphatic hydrocarbon radical of from 1 to 6 carbon atoms selected from the group consisting of saturated radicals and olefinic radicals containing a —CH=CH— group, wherein each of the acidic hydrogen atoms is replaced by a bond to a metal ion selected from calcium and titanium. They are neutral in the sense that the arsonic acid acidic hydrogen atoms are replaced as stated. In the calcium salts, the calcium cation forms a bond in the ratio of one calcium atom to one organoarsonate radical. Calcium methylarsonate, for example, may be represented by the formula $CH_3As(=O)O_2Ca$. In the titanium salts employed in practicing the method of this invention, a tetravalent titanium cation may form the stated salts in the ratio of one titanium atom to two organoarsonate radicals; or the salt may be an oxyorganoarsonate, with a ratio of one titanium atom to one organoarsonate radical, the remainder of the valences of tetravalent titanium being satisfied by bonding to oxygen; and so forth. In any case, the salts will be neutral organoarsonate salts, conforming to the above-stated description.

Illustrative of the calcium and titanium salts which may be employed in this connection are salts of saturated and olefinic organoarsonic acids, including methylarsonic acid, ethylarsonic acid, propylarsonic acid, allylarsonic acid, butylarsonic acid, amylarsonic acid, hexylarsonic acid, and so forth. Preparation of these salts is readily effected as known in the art, by contacting a soluble salt of the selected organoarsonic acid, such as the common disodium methylarsonate, with a soluble salt of the metal such as calcium chloride or titanium tetrachloride, in aqueous solution, which precipitates out the water-insoluble metal salt. Illustrative of presently useful salts are calcium methylarsonate, calcium ethylarsonate, calcium propylarsonate, calcium butylarsonate, calcium amylarsonate, calcium hexylarsonate, calcium allylarsonate, titanium methylarsonate, titanium ethylarsonate, titanium propylarsonate, titanium butylarsonate, titanium hexylarsonate, and so forth. The calcium salts are particularly preferred.

The stated organoarsonate salts will generally be combined with a carrier to facilitate even application thereof. On the one hand, the carrier may be liquid. Where the carrier is liquid, the resulting compositions will be dispersions of the salts, where dispersions include solutions. Dispersions of the stated salts in a liquid carrier like water, in which their solubility is very low, may be prepared by vigorous agitation of the mixture of salt and water, preferably with a wetting or suspending agent or both. Useful liquid compositions may also be prepared by mixing an organic liquid such as Stoddard solvent with water, a wetting agent, and one of the presently employed metal salts. Wetting agents illustrative of those which may be used for preparing such compositions are soaps such as sodium abietate, long chain alcohols such as dodecyl alcohol, alcohol sulfate salts such as sodium dodecyl sulfate, alkyl sulfonates such as dioctyl sodium sulfosuccinate, fatty acid esters such as sorbitan monolaurate, and the like.

On the other hand, and preferably, the carrier with which the stated organoarsonate salts is mixed may be a solid carrier, thereby forming a particulate, finely divided dry composition such as granules or a dust. Illustrative of inert solid carriers are, for example, vermiculite, pyrophyllite, diatomaceous earth, volcanic ash, talc, clay, bentonite, pumice, fuller's earth, lime, wood flour, ground corn husks, ground sugar cane and the like.

It is not necessary that the carrier be inert. It may exhibit activity in itself, comprising, for example, a beneficial agricultural active chemical such as a fertilizer like ground phosphate rock, a toxic agricultural active chemical like calcium arsenate and so forth. Active chemicals having either beneficial or toxic activity may also be included in compositions comprising the presently employed salts in amounts less than sufficient to act as carrier therefor. For example, the composition applied to soil containing weed seeds may include a soil stabilizer, a nematocide, a soil fumigant, a soil sterilizer, a fungicide, another herbicide, or the like.

In practicing the method of the invention, a composition comprising one of the stated salts, as such or associated with a carrier, will be applied to soil containing crabgrass seed. Each crabgrass plant produces thousands of seeds, and most topsoil contains seeds of this noxious weed. The present method will effect control of different types of crabgrass, and the stated seed may be the seed of smooth crabgrass, *Digitaria ischaemum* including the *D. longiflora* and *D. serotina* varieties thereof, or of hairy crabgrass, *Digitaria sanguinalis*.

The application of the salt to the soil may and generally will involve at least some contact of the salt with turf grass and like valuable vegetation growing in the soil treated. Because the presently employed salts have little or no toxic effect on the desirable turf grasses at the application rates used in the method of this invention, it is unnecessary for the user to be concerned about this.

The soil treated, containing crabgrass seed, may also contain seed of other vegetation which, unlike crabgrass, is valuable and desirable. For example, it may contain turf grass seed. The unusual selectivity of the presently preferred salts is such that they will exert a pre-emergent toxicity only towards the crabgrass present as seed in the soil, and not towards turf grass or like useful vegetation present as seeds in the soil. An embodiment of this invention particularly contemplated is the application of the stated herbicidal calcium and titanium salts to soil containing crabgrass seed and also turf grass seed, whereby to effect a selective pre-emergent herbicidal action towards the crabgrass seed only. Alternatively, turf grass seed may be planted after crabgrass seed kill has been effected. It is a particular virtue of the presently preferred salts that reseeding with turf grass seed can be effected at any convenient time, before, during or after the herbicidal treatment of the soil.

The turf grasses and plants which may be present as such or in the form of seeds in soil treated to suppress growth of crabgrass from seeds according to this invention without suffering material destruction may include, for example, sod-forming perennials such as Kentucky and Merion bluegrass, Zoysia and Bermuda grasses, bentgrass, ryegrass and fescue.

The manner of application of the salts to the soil will generally comprise merely applying the salts to the soil surface. The crabgrass seeds which germinate in any year are the ones close to the soil surface. Unless the soil is turned over to bring them to the surface, crabgrass seeds at depths below about one-half inch will not germinate. The herbicidal salts do not, accordingly, need to be worked into the soil to exert their toxic action. Deposition on the soil surface is found to be entirely effective in producing the desired pre-emergent crabgrass control.

Referring to the amount of the salt to be applied to the soil surface, this will be at least about one-half pound per thousand square feet. To accomplish the purposes of this invention, the amount used will be at least sufficient to prevent crabgrass from substantially outliving the germination period thereof. The amount required to effect this may vary, between one-half and about 4 pounds per thousand square feet. The potency of the calcium and titanium salts varies as the cation is varied, and also tends to vary to some extent as the aliphatic radical chain length of the orgnoarsonate radical changes. The amount of salt needed varies with its potency. Another factor to be considered in connection with the minimum application rate is the point at which the salt will stop development of the crabgrass. Higher rates within the stated range are observed to prevent crabgrass from emerging from the soil at all. If the seeds do begin to germinate, germination does not proceed as far as the point at which the crabgrass seedlings break through the soil surface. Somewhat lower rates still achieve destruction of the crabgrass although the seedlings do emerge. Germination, during which a plant is dependent on the food stored in the plant seed, is termined only when the plant seedling has emerged into the air and developed at least its first two leaves. The goal of pre-emergent herbicidal methods is achieved when the species to be controlled is kept from developing substantially beyond the germination period. Regardless of whether or not germination is initiated or proceeds to some extent, if the seedling does not substantially outlive its germination period, the plant is effectively kept from becoming established. Thus rates of the present salt including lower rates, of at least about one-half pound per thousand square feet, which keep crabgrass seeds from substantially outliving their germination period are contemplated as a useful embodiment of this invention. These rates will generally be somewhat lower than those required of the same salt to prevent crabgrass emergence entirely.

The stated rate of at least one-half pound per thousand square feet of these salts is to be understood to refer to the salts used as the sole active pre-emergent herbicide in herbicidal compositions applied to crabgrass seed. Herbicidal compositions may be formulated which comprise these salts associated with another active chemical such as a herbicide effective for the preemergent control of crabgrass seed, as mentioned above. When such compositions are used for crabgrass seed control, the effect of the other herbicidal chemical may supplement that of the arsonate salt to the extent that amounts less than one-half pound per thousand square feet of the latter may be effective. It is to be understood that when reference is made in the description and claims herein to rates of application of the arsonate salt, this includes use of such mixtures of the arsonate salt with another pre-emergent herbicide including a substantial proportion of arsonate salt at rates appropriate to the activities of the mixture components which are sufficient to prevent crabgrass seed from substantially outliving its germination period.

A maximum is set on the rate of application by the requirement that the present procedure be practiced in such a manner as to avoid destruction of material quantities of useful grasses and plants and seeds thereof in the soil treated. At excessively high rates of application, the presently employed calcium and titanium arsonates may injure such organisms. However, the rates causing injury thereto are substantially higher than those effective to control crabgrass by treatment of soil containing crabgrass seed. Some of the presently employed salts are more selective between crabgrass and turf grass seeds than others. As will appear from the data given hereinafter, the salts of propyl- and butyl-arsonic acid have been found to have a particularly wide spread between the rates toxic to crabgrass seed and the rates toxic to turf grass seed. These salts, especially the calcium salts of the stated acids, are preferred for use in practicing the present method, especially where turf grass seed destruction is to be avoided.

Generally, application rates of between about one-half and about four pounds per thousand square feet will be employed. More specifically, and particularly referring to the more active members of the group of salts employed in accordance with this invention, the application rate will usually be between about one-half and about two and one-half pounds per thousand square feet. As has been mentioned, the potency of the salts varies, and the preferred application rate for calcium methylarsonate will be from about 1.5 to about 2.5 pounds per thousand square feet, while for calcium butylarsonate, it will be from about 0.75 to about 1.5 pounds per thousand square feet, and for titanium methylarsonate, it will be about from one to two pounds per thousand square feet. In all cases the stated rates refer to application rates of the herbicidally active salt itself, and where a composition comprising one or more additional components such as a carrier is employed, application rates will be calculated on the active salt, rather than on the total weight of the composition applied.

As will be understood, treatment of soil by the method of this invention will be conducted at a time adapted to inhibit the germination of crabgrass seed, prior to the ensuing growing season. In temperate climates, accordingly, the treatment is preferably given in the early spring. It may be made earlier than this, during the winter or even during the autumn, after the end of the crabgrass growing season. In any event, it should be applied prior to the germination time of the crabgrass seed. The duration of effectiveness of treatment of soils with the presently employed salts is long: crabgrass is unable to grow in soil so treated for at least a season, or even longer, after the treatment.

While particular reference has been made in the preceding discussion to crabgrass as the weed to be controlled by the presently provided novel method, it is to be appreciated that it may also be used for pre-emergent control of other undesirable weeds. Turf grasses are generally sod-forming, spreading perennials. The grasses which grow in clamps or bunches, known as bunchgrasses, do not form the desired sod structure and are considered weedy pests in sod-forming turf grasses. Annual grasses do not provide the desired permanent ground cover, and are therefore regarded as weeds. The present method of pre-emergent weed control has value for the control of unwanted vegetation including both annual and perennial bunch-grass weeds. Thus for example, it may be used to eradicate objectionable annual grasses prevalent in turf grass, such as foxtail (*Setaria viridis, lutescenes, verticillata* and *faberii*), barnyard grass (*Echinochloa crusgalli*), lemon grass, goosegrass (*Eleusine indica*), sandbur (*Cenchrus pauciflorus*), and witchgrass (*Panicum capillare*). It may also be used to effect pre-emergent control of the growth of certain other species of vegetation such as knotweed (*Polygonum aviculare*) and common chickweed (*Stellaria media*), and of bunchgrasses which are unwanted and considered weeds in environments where sod-forming perennial turf grasses and like vegetation are cultivated. These weedy grasses may include, for example, dallisgrass (*Paspalum dilatatum* Poir), which is an upright-growing bunching grass, nutgrass (*Cyperus rotundus*), yellow nutgrass (*Cyperus esculentus*), and the like. Thus for example, the present method can be used to effect selective pre-emergent control of dallisgrass in stands of sod-forming turf grasses, by applying the salts to soil containing dallisgrass seeds at rates like those mentioned above in reference to crabgrass control.

It is also to be appreciated that, in referring to soil in the foregoing discussion as the object of treatment by the present novel method, it is intended to include any natural or synthetic seed growth environments infested by seeds of crabgrass or like grasses regarded as undesirable in turf culture. Synthetic growth environments used, for example, in greenhouses, such as perlite and growth media such as peat moss are accordingly included by the term soil, as well as natural earth.

The invention is illustrated but not limited by the following examples:

EXAMPLE I-IV

Standard wooden greenhouse flats were seeded with turf grasses consisting of chewings fescue, highland bent and Kentucky blue, and crabgrasses consisting of smooth crabgrass (*Digitaria ischaemum*) and hairy crabgrass (*Digitaria sanguinalis*). The seeds were covered with a very thin layer of soil and then the soil was immediately treated by dusting evenly over the surface powdered calcium alkylarsonates at the concentrations and as identified below. Standard greenhouse procedure was followed in caring for all flats, including control flats seeded like the treated flats, but not given any chemical treatment. About seven and a half weeks after the seeding, the readings presented in the following tables were recorded. The readings describe the condition of the grasses in the flats in terms of stand and normality ratings, on a scale in which for Stand (S) 0=none, 10=100% and intermediate ratings indicate a stand between 0 and 100% germination. In the scale for Normality (N), 0=dead, 10=normal, and intermediate figures indicates intermediate ratings. Thus the rating of 10—10 is ideal for turf grass tolerance and a rating of 0—0 is ideal for crabgrass control.

After the readings had been made and recorded, the flats which had been treated with the higher rates of the arsonates were reseeded to check persistence of the chemicals in the soil. No additional chemical was applied to the flats at this time. Standard greenhouses procedure was again followed in caring for all the flats. After six weeks the flats were examined and stand and injury ratings recorded as indicated in the following tables.

Controls
(SEEDED ONLY; NO CHEMICALS APPLIED)

|  | Stand | Normality |
|---|---|---|
| Turfgrasses: |  |  |
| Blue | 10<br>9 | 10<br>9 |
| Fescue | 10<br>10 | 10<br>10 |
| Bent | 10<br>9 | 10<br>9 |
| Crabgrasses: |  |  |
| Smooth | 10<br>10 | 10<br>10 |
| Hairy | 10<br>10 | 10<br>10 |

EXAMPLE I
*Soil Treated with Calcium Methylarsonate*

|  | Rate (lbs. per 1,000 sq. ft.) | | | |
|---|---|---|---|---|
|  | 1.0 lbs. | | 2.0 lbs. | |
|  | S-N | Reseed S-N | S-N | Reseed S-N |
| Turfgrasses: |  |  |  |  |
| Blue | 10-10 | 9-9 | 9-9 | 9-9 |
| Fescue | 10-10 | 7-9 | 3-4 | 6-8 |
| Bent | 10-10 | 9-9 | 10-10 | 9-9 |
| Crabgrasses: |  |  |  |  |
| Smooth | 2-3 | 2-2 | 2-1 | 2-1 |
| Hairy | 3-4 | 1-2 | 1-2 | 1-1 |

EXAMPLE II
*Soil Treated With Calcium Ethylarsonate*

|  | Rate (lbs. per 1,000 sq. ft.) | | | | |
|---|---|---|---|---|---|
|  | 0.5 lbs. | 1.0 lbs. | | 2.0 lbs. | |
|  | S-N | S-N | Reseed S-N | S-N | Reseed S-N |
| Turfgrasses: |  |  |  |  |  |
| Blue | 10-10 | 10-10 | 10-10 | 10-10 | 10-10 |
| Fescue | 10-10 | 10-10 | 10-10 | 3-3 | 10-10 |
| Bent | 10-10 | 10-10 | 10-10 | 10-10 | 10-10 |
| Crabgrasses: |  |  |  |  |  |
| Smooth | 5-10 | 1-1 | 0-0 | 0-0 | 0-0 |
| Hairy | 2-9 | 2-6 | 1-1 | 1-1 | 0-0 |

EXAMPLE III
*Soil Treated With Calcium n-Butylarsonate*

|  | Rate (lbs. per 1,000 sq. ft.) | | | | | |
|---|---|---|---|---|---|---|
|  | 0.5 lbs. | | 1.0 lbs. | | 2.0 lbs. | |
|  | S-N | Reseed S-N | S-N | Reseed S-N | S-N | Reseed S-N |
| Turfgrasses: |  |  |  |  |  |  |
| Blue | 9-6 | 9-9 | 7-7 | 7-8 | 5-5 | 7-8 |
| Fescue | 10-10 | 10-10 | 10-10 | 9-9 | 4-8 | 4-7 |
| Bent | 7-6 | 6-5 | 9-9 | 8-9 | 8-8 | 5-6 |
| Crabgrasses: |  |  |  |  |  |  |
| Smooth | 8-3 | 2-1 | 0-0 | 0-0 | 0-0 | 0-0 |
| Hairy | 5-9 | 1-2 | 1-10 | 0-0 | 0-0 | 0-0 |

EXAMPLE VI
Soil Treated With Calcium n-Hexylarsonate

| | Rate (lbs. per 1,000 sq. ft.) | | | |
|---|---|---|---|---|
| | 1.0 lbs. | | 2.0 lbs. | |
| | S-N | Reseed S-N | S-N | Reseed S-N |
| Turfgrasses: | | | | |
| Blue | 2- 4 | 5- 9 | 1- 2 | 10-10 |
| Fescue | 2- 4 | 10-10 | 1- 3 | 10-10 |
| Bent | 2- 4 | 10-10 | 2- 3 | 10-10 |
| Crabgrasses: | | | | |
| Smooth | 0- | 6- 8 | 1- 5 | 6- 8 |
| Hairy | 2- 3 | 3- 8 | 1- 3 | 2- 4 |

EXAMPLES V-IX

Standard greenhouse flats were seeded with turf grasses and crab grasses, the seeds were covered with a thin layer of soil, and calcium alkylarsonates as identified below were dusted onto the seeded flats at different rates as indicated in the following tables, and standard greenhouse procedure was then followed in caring for all flats. Readings were made in which the condition of the grasses was rated for stand and normality on the scale described in the Examples I-IV above after a lapse of six weeks, and again, after a lapse of four more weeks. The results are presented in the following tables:

Control
SEEDED ONLY; NO CHEMICALS APPLIED

| | After 6 weeks | After 10 weeks |
|---|---|---|
| | S-N | S-N |
| Turfgrasses: | | |
| Blue | 10- 8 | 10-10 |
|  | 10-10 | 10-10 |
| Fescue | 10-10 | 10-10 |
|  | 10-10 | 10-10 |
| Bent | 10-10 | 10-10 |
|  | 10-10 | 10-10 |
| Crabrasses: | | |
| Smooth | 10-10 | 10-10 |
|  | 10-10 | 10-10 |
| Hairy | 10-10 | 10-10 |
|  | 10-10 | 10-10 |

EXAMPLE V
Soil Treated With Calcium Methylarsonate

| | Rate (lbs. per 1,000 sq. ft.) | | | |
|---|---|---|---|---|
| | 1.0 lbs. | | 1.5 lbs. | |
| | 6 weeks S-N | 10 weeks S-N | 6 weeks S-N | 10 weeks S-N |
| Turfgrasses: | | | | |
| Blue | 10-10 | 10-10 | 10- 9 | 10-10 |
|  | 9- 9 | 10- 7 | 9- 9 | 10- 9 |
| Fescue | 10-10 | 10-10 | 10- 9 | 8-10 |
|  | 10-10 | 7-10 | 9- 9 | 10-10 |
| Bent | 10-10 | 10-10 | 8- 9 | 9- 9 |
|  | 9- 9 | 10- 8 | 10-10 | 10-10 |
| Crabgrasses: | | | | |
| Smooth | 8- 3 | 3- 1 | 5- 3 | 5- 5 |
|  | 8- 2 | 5- 5 | 4- 1 | 2- 1 |
| Hairy | 8- 6 | 2- 1 | 2- 5 | 2-10 |
|  | 1- 1 | 0- 0 | 2- 1 | 0- 9 |
| | 2.0 lbs. | | 4.0 lbs. | |
| Turfgrasses: | | | | |
| Blue | 10- 9 | 10-10 | 6- 5 | 7- 9 |
|  | 10-10 | 10-10 | 10- 8 | 9- 7 |
| Fescue | 10- 9 | 9- 9 | 1- 3 | 0- 0 |
|  | 10-10 | 10-10 | 6- 5 | 4- 5 |
| Bent | 8- 9 | 10- 9 | 1- 4 | 3-10 |
|  | 10- 9 | 10-10 | 3- 5 | 4- 5 |
| Crabgrasses: | | | | |
| Smooth | 3- 1 | 1- 1 | 0- 0 | 0- 0 |
|  | 1- 1 | 1- 1 | 0- 0 | 0- 0 |
| Hairy | 1- 1 | 2- 2 | 0- 0 | 0- 0 |
|  | 0- 0 | 0- 0 | 0- 0 | 0- 0 |

EXAMPLE VI
Soil Treated With Calcium Ethylarsonate

| | Rate (lbs. per 1,000 sq. ft.) | | | |
|---|---|---|---|---|
| | 0.5 lbs. | | 1.0 lbs. | |
| | 6 weeks S-N | 10 weeks S-N | 6 weeks S-N | 10 weeks S-N |
| Turfgrasses: | | | | |
| Blue | 10-10 | 10-10 | 10-10 | 10-10 |
|  | 8- 8 | 9- 6 | 6- 7 | 10-10 |
| Fescue | 10-10 | 9-10 | 10-10 | 10-10 |
|  | 9- 9 | 10- 8 | 10-10 | 10-10 |
| Bent | 10-10 | 10-10 | 10-10 | 10-10 |
|  | 7- 7 | 10- 8 | 9- 9 | 10-10 |
| Crabgrasses: | | | | |
| Smooth | 6- 8 | 4- 4 | 0- 0 | 0- 0 |
|  | 4- 1 | 3- 8 | 0- 0 | 0- 0 |
| Hairy | 10-10 | 9-10 | 1- 1 | 1- 1 |
|  | 3- 1 | 3- 2 | 0- 0 | 0- 0 |
| | 1.5 lbs. | | 2.0 lbs. | |
| Turfgrasses: | | | | |
| Blue | 10- 9 | 10-10 | 10-10 | 9-10 |
|  | 10-10 | 10- 9 | 10- 9 | 9- 9 |
| Fescue | 10-10 | 10- 9 | 10-10 | 10-10 |
|  | 10-10 | 10- 9 | 10-10 | 9- 9 |
| Bent | 10-10 | 10-10 | 10-10 | 10-10 |
|  | 10-10 | 10-10 | 9- 9 | 10-10 |
| Crabgrasses: | | | | |
| Smooth | 0- 0 | 0- 0 | 0- 0 | 0- 0 |
|  | 0- 0 | 0- 0 | 0- 0 | 0- 0 |
| Hairy | 0- 0 | 0- 0 | 0- 0 | 0- 0 |
|  | 0- 0 | 0- 0 | 0- 0 | 0- 0 |
| | 4.0 lbs. | | | |
| Turfgrasses: | | | | |
| Blue | 5- 5 | 7-10 | | |
|  | 9- 6 | 7- 9 | | |
| Fescue | 3- 1 | 0- 0 | | |
|  | 2- 1 | 1- 1 | | |
| Bent | 1- 1 | 1- 1 | | |
|  | 1- 1 | 1- 1 | | |
| Crabgrasses: | | | | |
| Smooth | 0- 0 | 0- 0 | | |
|  | 0- 0 | 0- 0 | | |
| Hairy | 0- 0 | 0- 0 | | |
|  | 0- 0 | 0- 0 | | |

EXAMPLE VII
Soil Treated With Calcium n-Propylarsonate

| | Rate (lbs. per 1,000 sq. ft.) | | | |
|---|---|---|---|---|
| | 0.5 lbs. | | 1.0 lbs. | |
| | 6 weeks S-N | 10 weeks S-N | 6 weeks S-N | 10 weeks S-N |
| Turfgrasses: | | | | |
| Blue | 10-10 | 10-10 | 9-10 | 10-10 |
| Fescue | 10-10 | 10-10 | 10-10 | 10-10 |
| Bent | 10-10 | 10-10 | 10-10 | 10-10 |
| Crabgrasses: | | | | |
| Smooth | 1- 1 | 0- 0 | 0- 0 | 0- 0 |
| Hairy | 1- 1 | 0- 0 | 0- 0 | 0- 0 |
| | 1.5 lbs. | | 2.0 lbs. | |
| Turfgrasses: | | | | |
| Blue | 10- 7 | 10-10 | 1- 2 | 2- 9 |
| Fescue | 8- 7 | 8- 8 | 1- 2 | 0- 0 |
| Bent | 5- 4 | 8- 8 | 1- 1 | 1- 1 |
| Crabgrasses: | | | | |
| Smooth | 0- 0 | 0- 0 | 0- 0 | 0- 0 |
| Hairy | 0- 0 | 0- 0 | 0- 0 | 0- 0 |
| | 4.0 lbs. | | | |
| Turfgrasses: | | | | |
| Blue | 6- 4 | 7- 9 | | |
| Fescue | 2- 1 | 1- 1 | | |
| Bent | 1- 1 | 1- 1 | | |
| Crabgrasses: | | | | |
| Smooth | 0- 0 | 0- 0 | | |
| Hairy | 0- 0 | 0- 0 | | |

EXAMPLE VIII

Soil Treated with Calcium Butylarsonate

| | Rate (lbs. per 1,000 sq. ft.) | | | |
|---|---|---|---|---|
| | 0.5 lbs. | | 1.0 lbs. | |
| | 6 weeks S-N | 10 weeks S-N | 6 weeks S-N | 10 weeks S-N |
| Turfgrasses: | | | | |
| Blue | 10-10 | 10-10 | 10-10 | 10-10 |
| Fescue | 10-10 | 10-10 | 10-10 | 10-10 |
| Bent | 10-10 | 10-10 | 10-10 | 10-10 |
| Crabgrasses: | | | | |
| Smooth | 0- 0 | 0- 0 | 0- 0 | 0- 0 |
| Hairy | 0- 0 | 0- 0 | 0- 0 | 0- 0 |
| | 1.5 lbs. | | 2.0 lbs. | |
| Turfgrasses: | | | | |
| Blue | 10- 8 | 10-10 | 5- 3 | 7-10 |
| Fescue | 5- 5 | 4- 5 | 3- 2 | 2- 6 |
| Bent | 8- 5 | 10-10 | 3- 2 | 5-10 |
| Crabgrasses: | | | | |
| Smooth | 0- 0 | 0- 0 | 0- 0 | 0- 0 |
| Hairy | 0- 0 | 0- 0 | 0- 0 | 0- 0 |

EXAMPLE IX

Soil Treated with Calcium Amylarsonate

| | Rate (lbs. per 1,000 sq. ft.) | | | |
|---|---|---|---|---|
| | 0.5 lbs. | | 1.0 lbs. | |
| | 6 weeks S-N | 10 weeks S-N | 6 weeks S-N | 10 weeks S-N |
| Turfgrasses: | | | | |
| Blue | 10-10 | 10-10 | 5- 7 | 6- 7 |
| Fescue | 10-10 | 10-10 | 10-10 | 10-10 |
| Bent | 10-10 | 10-10 | 10-10 | 10-10 |
| Crabgrasses: | | | | |
| Smooth | 10-10 | 5- 5 | 1- 4 | 0- 0 |
| Hairy | 8-10 | 6- 8 | 0- 0 | 1- 1 |
| | 2.0 lbs. | | | |
| Turfgrasses: | | | | |
| Blue | 8- 7 | 10-10 | | |
| Fescue | 7- 7 | 8-10 | | |
| Bent | 8- 8 | 10-10 | | |
| Crabgrasses: | | | | |
| Smooth | 0- 0 | 0- 0 | | |
| Hairy | 0- 0 | 0- 0 | | |

EXAMPLE X

Titanium methylarsonate was applied at rates of one and two pounds per thousand square feet to soil containing crabgrass seed. At both rates, germination of the seed was substantially completely suppressed.

A discriminatory effect in suppressing growth of crabgrasses while having no deleterious effect on turf grasses may also be produced by applying to soil containing seeds of these grasses, in a concentration within the ranges set forth above, other arsonate salts within the scope of this invention including calcium allylarsonate, titanium ethylarsonate, titanium propylarsonate, titanium butylarsonate, and so forth.

Application of one of the presently contemplated alkylarsonate salts such as, for example, calcium methylarsonate, calcium ethylarsonate, or calcium propylarsonate to soil containing seeds of dallisgrass (*Paspalum dilatatum* Poir), at a rate as set forth hereinabove, which is not injurious to turf grass seeds, will effect suppression of the growth of the dallisgrass.

While the invention has been described with particular reference to various specific preferred embodiments thereof, it will be appreciated that other variations and modifications can be made within the scope of the invention as defined in the appended claims.

What is claimed is:

1. The method of selectively preventing the establishment of crabgrass which comprises applying to soil containing crabgrass seed, a salt selected from the group consisting of neutral calcium and titanium organoarsonates wherein the organic radical of the organoarsonate is an aliphatic hydrocarbon radical of from 1 to 6 carbon atoms selected from the group consisting of saturated radicals and olefinic radicals containing a —CH=CH— group in an amount of at least about one-half pound per thousand square feet, and sufficient to prevent crabgrass seed from substantially outliving the germination period thereof, but insufficient to destroy material quantities of useful grasses and plants and seeds thereof in said soil.

2. The method of claim 1 in which said salt is a neutral calcium salt of an alkylarsonate wherein the alkyl radical of said alkylarsonate is a saturated aliphtic hydrocarbon radical containing from 1 to 6 carbon atoms.

3. The method of claim 1 in which said salt is calcium methylarsonate.

4. The method of selectively preventing the growth of crabgrass which comprises applying calcium methylarsonate to soil containing crabgrass seed in an amount of between about 1.5 and about 2.5 pounds per thousand square feet.

5. The method of claim 1 in which said salt is calcium ethylarsonate.

6. The method of claim 1 in which said salt is calcium n-propylarsonate.

7. The method of claim 1 which said salt is calcium n-butylarsonate.

8. The method of selectively preventing the growth of crabgrass which comprises applying calcium n-butylarsonate to soil containing crabgrass seed in an amount of between about 0.75 and about 1.5 pounds per thousand square feet.

9. The method of claim 1 in which said salt is titanium methylarsonate.

10. The method of selectively preventing the growth of crabgrass which comprises applying titanium methylarsonate to soil containing crabgrass seed in an amount of between about 1 and about 2 pounds per thousand square feet.

11. The method of claim 1 in which said salt is applied to said soil containing crabgrass seed in an amount sufficient to prevent crabgrass emergence.

12. The method of claim 1 in which said salt is applied to said soil containing crabgrass seed after the end of one crabgrass growing season and before germination of crabgrass seed in the ensuing growing season has begun.

13. The method of claim 1 in which said salt is applied to soil containing crabgrass seed in which useful, sod-forming turf grasses are growing.

14. The method of claim 1 in which said salt is applied to soil containing crabgrass seed and containing the seeds of useful, sod-forming grasses.

15. The method of selectively preventing the establishment of unwanted annual grasses which comprises applying to soil containing seeds of undesirable annual grasses a salt selected from the group consisting of neutral calcium and titanium organoarsonates wherein the organic radical of the organoarsonate is an aliphatic hydrocarbon radical of from 1 to 6 carbon atoms selected from the group consisting of saturated radicals and olefinic radicals containing a —CH=CH— group in an amount of at least about one-half pound per thousand square feet, and sufficient to prevent said unwanted annual grass seed from substantially outliving the germination period thereof, but insufficient to destroy material quantities of useful grasses and plants and seeds thereof in said soil.

16. The method of selectively preventing the establishment of unwanted bunch-grasses which comprises applying to soil containing the seed of said undesirable bunch-grasses a salt selected from the group consisting of neutral calcium and titanium organoarsonates wherein the organic radical of the organoarsonate is an aliphatic hydrocarbon radical of from 1 to 6 carbon atoms selected from the group consisting of saturated radicals and olefinic radicals containing a —CH=CH— group in an amount of at least about one-half pound per thousand square feet, and sufficient to prevent said undesirable bunch-grass seeds from substantially outliving the germination period thereof, but insufficient to destroy material quantities of sod-forming perennial grasses and plants and seeds thereof in said soil.

17. The method of claim 16 in which said soil contains dallisgrass seed and said salt is applied to said soil in an amount sufficient to prevent dallisgrass seed from substantially outliving the germination period thereof.

References Cited in the file of this patent
UNITED STATES PATENTS

| | | |
|---|---|---|
| 2,642,354 | Barrons | June 16, 1953 |
| 2,678,265 | Schwerdle | May 11, 1954 |